United States Patent [19]

Anneberg et al.

[11] E Re. 29,232

[45] Reissued May 24, 1977

[54] MAGNETIC STEREOPHONIC PHONOGRAPH PICKUP

[75] Inventors: Vilhelm Anneberg, Herlev; Ellen Clemmensen, Birkerod; Robert Gudmandsen, Tastrup; Axel Scheibel, Kobehhavn NV, all of Denmark

[73] Assignee: Fonofilm Industri A/S, Copenhagen, Denmark

[22] Filed: Oct. 23, 1974

[21] Appl. No.: 517,222

Related U.S. Patent Documents

Reissue of:

[64] Patent No.: 3,700,829
Issued: Oct. 24, 1972
Appl. No.: 885,220
Filed: Dec. 15, 1969

[30] Foreign Application Priority Data

Mar. 25, 1969 Denmark ..... 1636/69

[52] U.S. Cl. ..... 179/100.41 K; 179/100.41 M; 179/100.41 Z

[51] Int. Cl.[2] ..... H04R 11/12

[58] Field of Search ..... 171/100.41 K, 100.41 Z, 171/100.41 M, 100.41 R, 100.41 S; 274/37

[56] References Cited

UNITED STATES PATENTS

| | | | |
|---|---|---|---|
| 3,294,405 | 12/1966 | Pritchard | 179/100.41 K |
| 3,469,040 | 9/1969 | Shaper | 179/100.41 K |
| 3,538,266 | 11/1970 | Cho | 179/100.41 K |

FOREIGN PATENTS OR APPLICATIONS

| | | | |
|---|---|---|---|
| 40-10187 | 5/1965 | Japan | 179/100.41 K |

*Primary Examiner*—Raymond F. Cardillo, Jr.
*Attorney, Agent, or Firm*—Pollock, Vande Sande & Priddy

[57] ABSTRACT

A magnetic stereophonic pickup having four coil carrying core members arranged symmetrically around the axis of an annular ceramic magnet against the inner pole and end face of which one end of said core members abut the opposite ends being magnetically interconnected. A magnetic armature connected to a stylus is so supported within and coaxial with the magnet that it can oscillate in any direction about a point adjacent the outer end thereof. The armature acts as a variable magnetic load converting stylus movements into variations of the magnetic potentials at the magnet abutting ends of the core members, said potential variations in turn causing flux variations in the coil carrying core members.

18 Claims, 8 Drawing Figures

Figure 1:
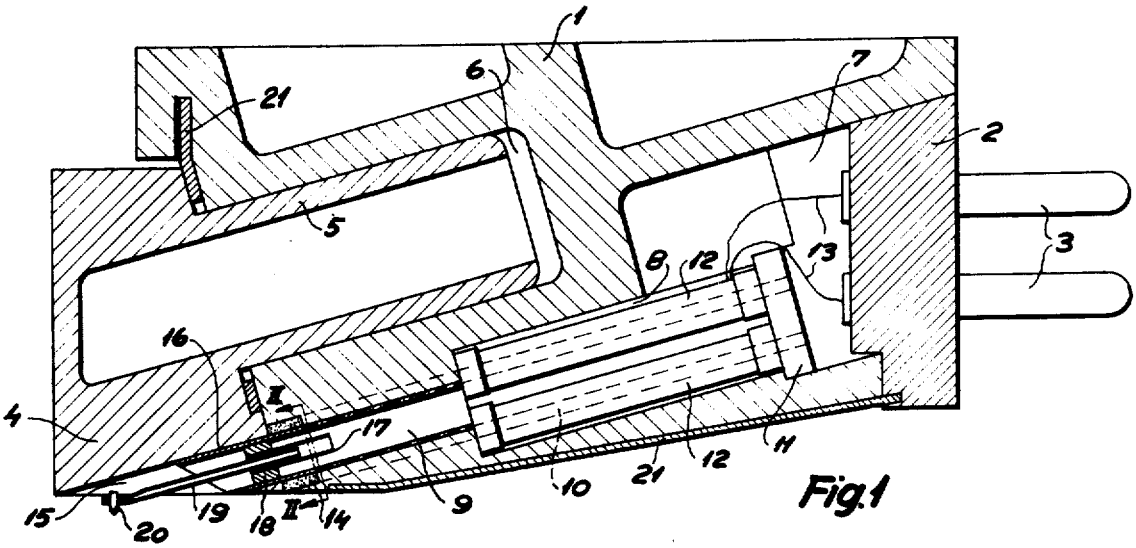

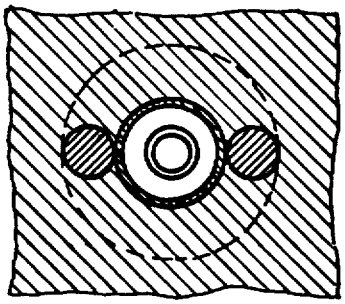
Fig. 2A
Fig. 4
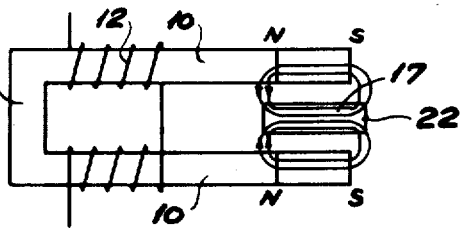
Fig. 4A
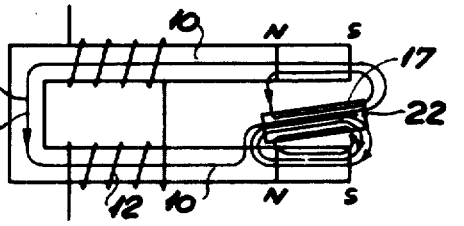
Fig. 5
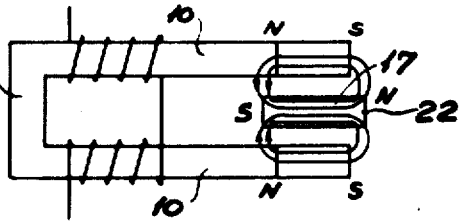
Fig. 5A
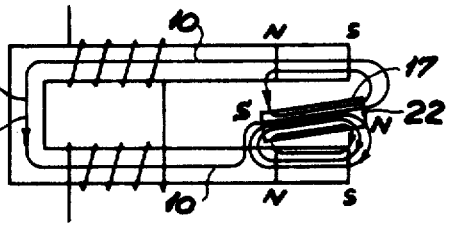

MAGNETIC STEREOPHONIC PHONOGRAPH PICKUP

Matter enclosed in heavy brackets [ ] appears in the original patent but forms no part of this reissue specification; matter printed in italics indicates the additions made by reissue.

This invention relates to electromagnetic transducers for reproduction of stereophonic phonograph records.

More particularly the invention relates to such transducers having a magnetic structure defining an airgap and comprising four magnetic legs each surrounded by its respective coil as well as permanent magnetic means for producing a magnetic field in said airgap in which a stylus carrying armature is pivotally mounted. By arranging the magnetic legs in two pairs perpendicular to each other the signals produced by movements of the stylus can be decomposed into two components each corresponding to its respective recording track of a stereophonic record.

In the early pickup assemblies of this type the armature itself is constituted by a permanent magnet. However, the still increasing requirements as to reproduction of signals at the upper end of the tone frequency spectrum has led to the development of pickups in which the effective stylus mass has been reduced by using a permanent magnet placed outside the oscillating stylus system for producing the magnetizing force, so that the armature may be constituted by a light tube of magnetically conducting material such as soft iron.

The known pickups of this kind have the feature in common with other magnetic pickup assemblies that the armature is coupled magnetically in series with the coil carrying legs, so that the signal producing flux changes are produced by alterations of the overall reluctance of the magnetic circuit caused by movements of the armature.

According to the present invention a novel structure is provided in which the armature is so placed that it forms a magnetic load coupled in parallel to the permanent magnet or magnets, meaning that the armature and the magnet or magnets form a magnetic circuit independently of the four coil carrying legs which form two magnetic conductors each having both ends engaging the same pole face of said magnet or pole faces of the same polarity of said magnets. In the rest position of the armature in which the structure is perfectly symmetrical both ends of each magnetic conductor are at the same magnetic potential and hence no flux is flowing through the coil carrying legs. When the armature is deflected, however, the magnetic load on the permanent magnet portion opposite one end of a magnetic conductor is increased while the load on the magnet portion opposite the other end of said conductor is decreased resulting in the occurrence of a magnetic potential difference between the ends of the magnetic conductor whereby a flux is produced in the coil carrying legs.

An object of the invention is to provide an improved electromagnetic transducer in which the effective mass of the oscillating stylus system is reduced by placing the permanent magnet or magnets outside said system.

It is a further object of the invention to provide a transducer in which the magnetic structure including the armature is perfectly symmetrical.

A still further object of the invention is to provide a magnetic structure for use in a transducer in which the coil carrying legs can be made very thin thus allowing the use of signal coils having low resistance and capacity.

Another object of the invention is to provide an electromagnetic transducer which is easy and cheap to produce.

Still another object of the invention is to provide a magnetic stereo pickup having improved sound reproduction characteristics, particularly at the upper end of the tone frequency range.

Figure 2:
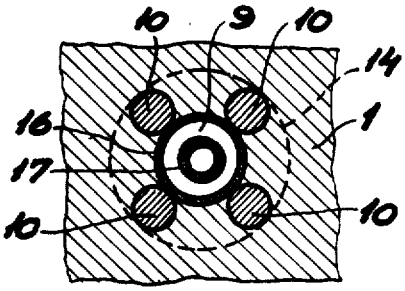
Figure 3:
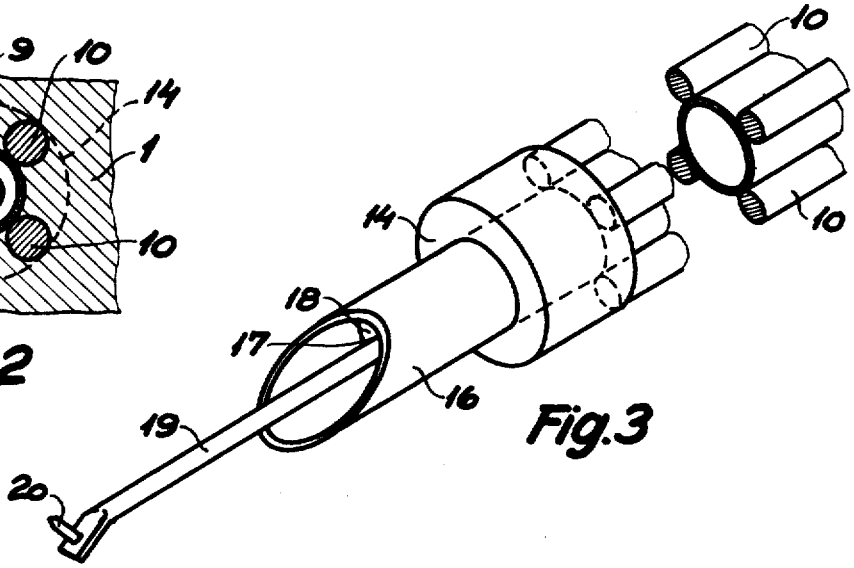

Other objects and advantages will appear from the following description when taken in conjunction with the accompanying drawings, in which:

FIG. 1 is a longitudinal section of an embodiment of the pickup according to the invention, FIG. 2 is a section along the line II—II in FIG. 1, FIG. 2A shows a monophonic variation of the section shown in FIG. 2, FIG. 3 is a perspective view of the front end of the magnetic system and the stylus assembly mounted therein, FIGS. 4 and 4a show schematically one half of the magnetic system with the armature in the neutral and deflected position, respectively, and FIGS. 5 and 5A are similar schematics showing a second embodiment of the magnetic system in which the armature is constituted by a permanent magnet.

The pickup shown in FIGS. 1–3 comprises a housing 1 cast in a suitable plastics material. At one end the housing has a recess 7 in which is mounted a contact member 2 with four legs 3, of which only two are shown in FIG. 1. At the other end of the housing is provided a replaceable stylus assembly comprising a cast plastic support body 4 which, by means of a projecting hollow guide pin 5 of non-circular cross-section, engages a recess 6 formed in the housing 1 and having the same cross-section.

Between the bottom of the recess 7 and the front face of the housing 1 is provided a through-going recess with a rear portion 8 of substantially square cross-section and a front portion 9 the cross-section of which, as indicated in FIG. 2, is formed as a middle circle and four peripheral circles tangential to the middle circle and equally spaced along the periphery thereof.

The said through-going recess 8, 9 serves as accommodation for the magnetic system which comprises four cylindrical legs of permalloy, the front portions of which are disposed in their respective cylindrical edge portions of the recess 9 and extend rearwardly through the recess 8. The rear ends of the legs 10 are attached to and interconnected magnetically by a cross member 11, which is likewise made of permalloy. About each leg 10 is disposed a coil 12 which is mounted in the recess 8, and each pair of diametrically opposed coils are connected to one another and to two of the legs 3 by leads 13. On the front ends of the legs 10 and in extension thereof is mounted an annular permanent magnet 14 which is magnetized in an axial direction and consists of a ceramic, magnetically anisotropic material. The magnet 14 is disposed in an enlarged section of the recess 9 at the front of the housing 1.

In the lower portion of the support body 4 of the stylus assembly is formed an inclined cylindrical, through-going channel 15 opening in the under face of the body and forming an elongation of the recess 9 in the housing 1. In this channel is secured a tube 16 of a non-magnetic material, for instance aluminium which projects from the support body 4 and, when the stylus assembly is fitted, enters the cylindrical central portion of the recess 9.

Within the tube 16 a tubular soft iron armature 17 is mounted by means of an annular, resilient pad 18, for instance of rubber or neoprene, to be freely pivotable in all directions about a point disposed in or adjacent to the center of the pad. The armature 17 is slightly longer than the annular magnet 14 and is disposed co-axial with and symmetrically with respect to the magnet. To the armature is attached one end of a tubular, thin-walled aluminium stylus arm 19 extending through the channel 15. The free end of the stylus arm 19 projecting outwardly of the support body 4 is flattened and supports a stylus 20.

On the under face of the housing 1 is mounted a magnetic screen 21 which extends upwardly along the front face of the housing between the housing and the support body 4 of the stylus assembly.

To illustrate the operation of the pickup FIG. 4 presents a schematic view of one half of the electromagnetic system corresponding to one sound channel of a stereo recording. The oscillation point of the armature is here designated 22. The anisotropic ceramic annular magnet 14 shows great reluctance in all directions perpendicular to the axial direction and is therefore magnetically equivalent to two permanent rod magnets 14a and 14b disposed at the end and in extension of their respective legs 10 as indicated in FIGS. 4 [ A ] and 4 [ B ] *a*, in which the said magnets 14a and 14b are presumed to have their north pole at the leg end. Assuming the two magnets 14a and 14b to be of equal strength, the magnetic conductor formed by the legs 10 and the cross member 11 will have the same magnetic potential at its two end faces in the shown neutral position of the armature 17, and no flux will therefore flow through this conductor. But a relatively high flux will pass from the north pole of each magnet through the armature to the south pole of the magnet, as indicated by the thin lines, and as the armature has a much lower reluctance than the ceramic magnets 14, 14a and 14b and the airgaps in actual practice are very small, this flux may with some justification be described as a short circuit flux, since a sufficient magnetic load is imparted to the permanent magnet that the magnetic potentials of the pole faces thereof are substantially reduced.

If the armature as a result of the stylus movement oscillates downwards in the plane of the paper about the point 22 as shown in FIG. 4a it will approach the lower magnet and thereby reduce the reluctance in the short circuit flux path for said magnet and simultaneously move away from the upper magnet, with the result that the short circuit flux thereof meets increased reluctance. In other words, the lower short circuit flux will be increased and the upper short circuit flux will be reduced. On account of the relatively high inherent reluctance of the magnets this will cause the magnetic potential at the north pole of the lower magnet to be reduced, while the magnetic potential at the north pole of the upper magnet will be increased. The combined effect of the increased magnetic potential of the upper magnet and the decreased reluctance of the lower air gap will result in a flux in the magnetic conductor 10, 11, 10 as illustrated by a single flux line f in FIG. 4a, inducing in the coil windings 12 electrical voltages which added together represent the sensed sound signal.

Armature oscillations resulting from the other sound channel follow a direction perpendicular to the plane of the paper and are converted in the same manner to electrical voltages in the second half of the electromagnetic system disposed in this plane.

The magnetic conductor 10, 11, 10 leads only the effective signal flux which changes direction in response to the armature oscillations, and the legs 10 can therefore be designed very thin without risking that the magnetic point of operation deviates from the rectilinear part of the magnetization curve.

The stereo pickup described above and shown in FIGS. 1–3 of the drawings can be changed into a mono pickup, as shown in FIG. 2A, merely by removing one pair of legs 10 and rotating the remaining pair an angle of approximately 45° about the common axis of the magnetic structure with respect to the stylus assembly.

In the embodiment described the armature 17 is constituted by a thin-walled tube of soft iron, by which the effective inertia of the oscillating stylus assembly is minimized. In FIGS. 5 and 5A, however, is schematically shown the magnetic circuit of an embodiment in which the armature 17 is constituted by a permanent magnet which may be tubular or rod shaped and which is poled oppositely to the fixed, outer magnet 14 of magnets 14a and 14b, so that it increases the short circuit flux. In this way the sensitivity of the pickup can be increased to some degree.

It will be understood that the invention is not limited to the embodiments shown and described and that it will be possible within the scope of the invention to modify the structure in various respects. Thus for example the legs 10 may be square or rectangular in cross-section instead of circular as also the armature may have other cross-section shapes.

What we claim is:

1. A magnetic structure for a stereophonic pickup in the form of an electromechanical transducer, said structure comprising a hollow cylindrical magnet made of a magnetizable ceramic material and having magnetic poles of opposite polarity at the end faces thereof, four elongated core members abutting one end face of said magnet and extending therefrom in a direction parallel to the axis thereof, said core members being arranged symmetrically with respect to said axis, means for magnetically interconnecting said core members at the ends thereof remote from said magnet, further comprising a stylus carrying *permanent magnet* armature, and means supporting said *permanent magnet* armature within and coaxial with said hollow cylindrical magnet for pivotal movement in all directions about a point of said axis spaced from [ the center point ] *any point located interiorly* of said magnet, *said permanent magnet poled oppositely to the polarity of said hollow cylindrical magnet.*

2. An electromagnetic transducer comprising in combination: a housing having a bore extending obliquely from one surface thereof, an annular permanent magnet of a ceramic material supported within said housing coaxially with and surrounding said bore a small distance from the outer end thereof, a ring of elastic material mounted within and engaging the walls of said bore adjacent *to but outside* the outer end of said magnet, a tubular *permanent magnet* armature supported by said ring and extending coaxially with said *angular* bore and said magnet beyond the inner end of the latter, a stylus arm fixed to said *permanent magnet* armature and carrying a stylus on its outer end extending beyond said surface of said housing, four rods of a high permeance material [ and with circular cross-section ] extending parallel to and equiangularly spaced around the axis of said bore, said rods abutting the inner end face of said magnet with their outer ends and extending beyond the inner end of said bore, a cross-piece of magnetizable material magnetically interconnecting the inner ends of said rods and fixedly held in said housing, and four coils mounted on the inner portions of said rods respectively between the inner end of said bore and said cross-piece, [ sand ] *said* coils being series connected in pairs each consisting of oppositely disposed coils and connected to respective terminals, *said permanent magnet having a polarity opposite to that of said annular permanent magnet.*

3. An electromechanical transducer comprising a magnetic structure defining an airgap [ and ] symmetrically disposed with respect to an axis therein, a stylus carrying armature *comprising a permanent magnet and* extending through said airgap and means pivotally mounting said armature around a pivot located on said axis adjacent *to but outside* one end of the airgap, said magnetic structure comprising magnetic means surrounding the armature and having magnetic poles of one polarity adjacent one end of the armature and magnetic poles of the opposite polarity adjacent the other end of the armature, *said permanent magnet poled opposite to the polarity of said magnetic means*, two pairs of core members symmetrically disposed with respect to the axis of the airgap and defining planes forming a right angle, said core members abutting magnetic pole faces of the same polarity at one end of said magnetic means, means for magnetically interconnecting the core members of each of said pairs at the ends thereof remote from said pole faces, and a coil mounted on each of said core members.

4. An electromechanical transducer as claimed in claim 3, in which the said magnetic means comprises a hollow cylindrical body made of a magnetizable ceramic material.

[ 5. An electromechanical transducer as claimed in claim 3 in which said armature comprises a permanent magnet. ]

6. An electromagnetic transducer comprising:

a pair of permanent magnet means arranged in spaced parallel relationship;

magnetic conductor means magnetically connecting two pole faces of said permanent magnet means having the same polarity, said two pole faces being connected to said magnetic conductor means;

coil means surrounding a portion of said magnetic conductor means for generating an electrical current in response to a magnetic flux induced in said coil means by said permanent magnet means;

an armature *comprising a further permanent magnet;* a stylus connected to said armature; and mounting means pivotally mounting said armature *for pivoting about a point located outside said permanent magnet means but* magnetically in parallel with said permanent magnet means to vary a magnetic load imparted to said permanent magnet means by said armature, *said permanent magnet poled opposite to the polarity of said annular cylindrical magnet.*

7. An electromagnetic transducer as defined in claim 6, further comprising:

a further pair of permanent magnet means arranged in spaced parallel relationship about a commmon longitudinal axis with said pair of permanent magnet means;

further magnetic conductor means magnetically connecting further two pole faces of said further pair of permanent magnet means having the same polarity, said further two pole faces being connected to said further magnetic conductor means; and further coil means surrounding a portion of said further magnetic conductor means for generating an electrical current in response to a magnetic flux induced in said further coil means by said further permanent magnet means;

wherein the respective planes defined by said pair of permanent magnet means and said further pair of permanent magnet means form substantially right angles with each other and said mounting means mounts said armature for pivotal movement in all directions.

8. An electromagnetic transducer as claimed in claim 7, wherein:

said permanent magnet means comprises four bar magnets arranged symmetrically and equiangularly spaced around said common longitudinal axis;

said magnetic conductor means comprises four rod-shaped members of a high permeance material and a common cross-piece magnetically interconnecting respective one ends of said four rod-shaped members, said four bar magnets connected to and forming extensions of the opposite ends of respective ones of said rod-shaped members; and said coil means and further coil means together comprise two pairs of series connected coil pairs oppositely disposed on portions of said rod-shaped members.

9. An electromagnetic transducer having a magnetic structure comprising an annular cylindrical magnet of a ceramic material magnetized in an axial direction and having a plurality of angularly spaced portions, magnetic conductor means, portions of which are surrounded by a coil, interconnecting a first pair of said angularly spaced portions, a stylus carrying armature *comprising a further permanent magnet*, means mounting said armature between said first pair of angularly spaced portions for pivotal movement *about a point external of said annular cylindrical magnet* in response to stylus movements in the plane of said first pair of spaced portions to cause variations in the magnetic load imparted to said spaced portions by said armature, said magnetic conductor means interconnecting two pole faces of the same polarity of said first pair of angularly spaced portions.

10. An electromagnetic transducer as defined in claim 9, further comprising a second magnetic structure having a second pair of angularly spaced portions arranged in spaced parallel relationship and interconnected by a second magnetic conductor, portions of which are surrounded by a second coil, wherein the planes of said first and second pairs of spaced portions form substantially right angles with respect to each other and wherein said first and second magnetic structures have a common longitudinal axis, said armature being mounted for pivotal movement in all direction between said first and second pairs of spaced portions.

11. An electromagnetic transducer as claimed in claim 10 in which said first and second magnetic conductors comprise four parallel rods of a high permeance material arranged symmetrically and equiangularly spaced around the axis of said cylindrical magnet with one end of said rods abutting one end face thereof, the opposite ends of said rods being magnetically interconnected by a common cross-piece.

12. An electromagnetic transducer as claimed in claim 11 in which said rods are circular in cross-section.

13. An electromechanical transducer, comprising:

a pair of permanent magnet portions having an airgap between them and providing respective components of magnetic flux similarly directed in said airgap;

yoke means magnetically connecting pole faces of like polarity of each said pair of permanent magnet portions together, said pole faces being connected to said yoke means;

electrical output coil means surrounding portions of said yoke means for generating electrical output signals induced by magnetic flux changes in said yoke means;

an armature *including a further permanent magnet*; and mounting means pivotally mounting said armature *for pivoting about a pivot point external of said permanent magnet portions and* magnetically in parallel with said pair of permanent *magnet portions to provide a path for said respective* [components of magnetic flux, to vary the magnetic ] potentials of said pole faces and to thereby produce said flux changes in said yoke means.

14. An electromechanical transducer as defined in claim 13, further comprising:

a further pair of permanent magnet portions arranged on opposite sides of said airgap and angularly spaced substantially 90° from said pair of permanent magnet portions;

wherein said yoke means magnetically connects further pole faces of like polarity of said further pair of permanent magnet portions;

further electrical output coil means surrounding further portions of said yoke means for generating further electrical output signals induced by magnetic flux changes in said further portions of said yoke means;

said mounting means mounting said armature for pivotal movement in all directions about [ a ] *said* pivot point on the central axis of said airgap and spaced therealong from a central point of symmetry of said pair and further pair of permanent magnet portions.

15. An electromechanical transducer as defined in claim 14, wherein said permanent magnetic portions comprise respective angularly spaced integral parts of a hollow cylindrical body of a magnetizable anisotropic material and having its direction of maximum permeability substantially parallel to its axis, said body being permanently magnetized in said direction, and surrounding said airgap.

[ 16. An electromechanical transducer as defined in claim 14, wherein said armature is made of a high permeance magnetic material. ]

[ 17. An electromechanical transducer as defined in claim 14, wherein said armature comprises a permanent magnet. ]

18. An electromechanical transducer as defined in claim 14, wherein said armature is tubular.

19. An electromechanical transducer as defined in claim 14, wherein said means for mounting said armature comprises a ring of resilient material supported along its outer periphery and engaging the armature along its inner periphery.

20. An electromechanical transducer as defined in claim 14, wherein said yoke means comprises four rods of a high permeance magnetic material extending substantially parallel to the central axis of the airgap, which rods at one end abut against their respective magnetic portions and at the opposite end are magnetically interconnected by means of a common cross-piece.

21. An electromagnetic transducer as defined in claim 13, wherein said pair of permanent magnet portions comprise portions of a cylindrical magnet having a hollow central axial portion, said armature being mounted for movement within said hollow central axial portion.

* * * * *